(12) United States Patent
Ramanathan et al.

(10) Patent No.: US 7,879,935 B2
(45) Date of Patent: Feb. 1, 2011

(54) SYNTHESIS OF NANOPARTICLES IN NON-AQUEOUS POLYMER SOLUTIONS AND PRODUCT

(75) Inventors: Lalgudi S. Ramanathan, Columbus, OH (US); Bhima R. Vijayendran, Dublin, OH (US); Michael D. Schulte, Montgomery, OH (US); Stephen S. Hardaker, Dalton, GA (US); Angela Hardaker, legal representative, Dalton, GA (US); Abhishek Gupta, Hilliard, OH (US); Joel D. Elhard, Hilliard, OH (US)

(73) Assignee: Battelle Memorial Institute, Columbus, OH (US)

( * ) Notice: Subject to any disclaimer, the term of this patent is extended or adjusted under 35 U.S.C. 154(b) by 207 days.

(21) Appl. No.: 11/570,187

(22) PCT Filed: Jun. 7, 2005

(86) PCT No.: PCT/US2005/019911

§ 371 (c)(1),
(2), (4) Date: Jul. 24, 2007

(87) PCT Pub. No.: WO2005/121222

PCT Pub. Date: Dec. 22, 2005

(65) Prior Publication Data

US 2007/0293611 A1    Dec. 20, 2007

Related U.S. Application Data

(60) Provisional application No. 60/577,558, filed on Jun. 7, 2004.

(51) Int. Cl.
*C08K 5/17* (2006.01)
*C08K 5/36* (2006.01)

(52) U.S. Cl. .................................. 524/200; 524/392
(58) Field of Classification Search ................ 524/200, 524/204, 392, 394
See application file for complete search history.

(56) References Cited

U.S. PATENT DOCUMENTS

| 5,173,526 | A | | 12/1992 | Vijayendran et al. |
|---|---|---|---|---|
| 5,962,608 | A | * | 10/1999 | Ryang et al. ............... 526/89 |
| 6,506,926 | B1 | * | 1/2003 | Bernard et al. ............ 558/378 |
| 2002/0145132 | A1 | * | 10/2002 | Won et al. ................. 252/500 |
| 2003/0174994 | A1 | * | 9/2003 | Garito et al. .............. 385/129 |
| 2004/0070094 | A1 | * | 4/2004 | Tomalia et al. ............. 264/4 |

(Continued)

FOREIGN PATENT DOCUMENTS

WO        WO 97/24224        7/1997

OTHER PUBLICATIONS

Petit, C.; Lixon, P.; Pileni, M.F., J. Phys. Chem., 1990, vol. 94, p. 1598.

(Continued)

*Primary Examiner*—Milton I Cano
*Assistant Examiner*—John Uselding
(74) *Attorney, Agent, or Firm*—Klaus Wiesmann

(57) ABSTRACT

The invention provides for production of nanoparticles dispersed in polymers where the nanoparticles include metals and metal oxides/sulfides that provide enhanced properties (e.g. higher refractive index) to the material. The nanoparticles are typically formed in situ within the polymer. Typically the nanoparticles are in the form of nanocrystals.

11 Claims, 2 Drawing Sheets

U.S. PATENT DOCUMENTS

2004/0253536 A1* 12/2004 Park et al. .............. 430/270.1

OTHER PUBLICATIONS

Watzke, H.J.; Fendler, J.H., J. Phys. Chem., 1987, vol. 91, p. 854.
Peng, X.; Guan, S.; Chai, X.; Jiang, Y.; Li, T., J. Phys. Chem., 1992, vol. 96, p. 3170.
Mahler, W., Inorg. Chem., 1988, vol. 27, p. 435.
Gallardo, S.; Gutierez M.; Henglein, A.; Janata E. Eer Bunsenges., Phys. Chem., 1989, vol. 93, p. 1080.
Wang, Y.; Herron, N.J., Phys. Chem., 1987, vol. 91, p. 257.
Nosaka, Y.; Yamaguchi, K.; Miyama, H.; Hayashi, H., Chem. Lett., 1988, p. 605.
Swayambunathan, V.; Hayes, D.; Schmidt, K.H.; Liao, Y.X.; Meisel, D., J. Am. Chem. Soc. 1990, vol. 112, p. 3831.
Nosaka, Y.; Ohta, N.; Fukuyama, T.; Fuji, NLJ., Colloid Interface Sci., 1993, vol. 155, p. 23.
W.D. Kirkey et al., Optical Properties of Polymer-Embedded Silicon Nanoparticles, Mat. Res. Soc. Symp. Proc., 2003, vol. 789, No. N.15.30, pp. 15.30.1-15.30.5, Boston.
M. Weibel et al., Preparation of Polymer Nanocomposites with "Ultrahigh" Refractive Index, Polym. Adv. Technol., 1991, vol. 2, pp. 75-80.
Kyprianidou-Leodidou, T. et al., Size Variation of PbS Particles in High-Refractive-Index Nanocomposites, J. of Phy. Chem., 1994, vol. 98, p. 8992-8997.
Zimmermann, L.; Wiebel, M.; Caseri, W.; Suter, U.W.; J. Mater. Res., 1993, vol. 8, p. 1742.
Zimmermann, L.; Weibel, M.; Caseri, W.; Suter, U.W.; Walter, P., Polym. Adv. Technol., 1993, vol. 4, p. 1.
M.L. Steigerwald et al., J. Chem. Phys., 1988, vol. 110, p. 3046.
Fischer, C.H.; Henglein, A.; J. Phys. Chem., 1989, vol. 93, p. 5578.
Lianos, P.; Thomas, J.K., J. Colloid Interface Sci., 1986, vol. 117(2), p. 505.

* cited by examiner

SYNTHESIS OF NANOPARTICLES IN NON-AQUEOUS POLYMER SOLUTIONS AND PRODUCT

This application is a national stage entry of PCT/US05/19911 filed Jun. 7, 2005 which claims priority from provisional application 60/577,558 filed Jun. 7, 2004.

FIELD OF THE INVENTION

The invention provides for production of nanoparticles dispersed in polymers where the nanoparticles include metals and metal oxides/sulfides that provide enhanced properties (e.g. higher refractive index) to the material. The products are useful in optical applications.

BACKGROUND OF THE INVENTION

It has been shown that nanocomposites of polymers and inorganic materials may exhibit optical properties that cannot be obtained with pure polymers alone. See references: Kyprianidou-Leodidou, T., Caseri, W., and Suter, U. W., J. Phys. Chem. 1994, v 98, pp 8992-8997; Weibel, M.; Caseri, W.; Suter, U. W.; Kiess, H.; Wehrli, E., Polym. Ado. Technol. 1991, v 2, p 75; Zimmermann, L.; Weibel, M.; Caseri, W.; Suter, U. W., J. Mater. Res. 1993, v 8, p 1742; and Zimmermann, L.; Weibel, M.; Caseri, W.; Suter, U. W.; Walther, P., Polym. Adv. Technol. 1993, v 4, p 1. For instance, the introduction of PbS in a polymer matrix can increase the refractive index to values of 2.5-3.0 at 632.8 nm rendering the nanocomposite suitable material for optical applications. It has also been shown that the refractive index in PbS-gelatin nanocomposites increases linearly with the PbS volume fraction in the experimentally available range 0-50% v/v PbS.

Colloidal semiconductor particles of different sizes can be produced by reactions that have been carried out under a variety of conditions such as in non-aqueous media (Steigerwald, M. L.; Alivisatos, A. P.; Gibson, J. M.; Harris, Kortan, R.; Muller, A. J.; Thayer, A. J.; Duncan, T. M.; Douglass, Brus, L. E., J. Chem. Phys. 1988, v110, p3046; and Fischer, C. H.; Henglein, A., J. Phys. Chem. 1989, v93, p5578), reversed micelle (Lianos, P.; Thomas, J. K., J. Colloid Interface Sci. 1986, 117 (2), p505; and Petit, C.; Lixon, P.; Pileni, M. F., J. Phys. Chem. 1990, v 94, p1598), vesicles (Watzke, H. J.; Fendler, J. H., J. Phys. Chem. 1987, v91, p854), Langmuir-Blodgett films (Peng, X.; Guan, S.; Chai, X.; Jiang, Y.; Li, T., J. Phys. Chem. 1992, v 96, p3170), polymers (Mahler, W., Inorg. Chem. 1988, v27, p435, and Gallardo, S.; Gutierez, M.; Henglein, A.; Janata, E. Eer. Bunsenges., Phys. Chem. 1989, v93, p1080), and porous crystalline zeolites (Wang, Y.; Herron, N. J., Phys. Chem. 1987, v91, p257). In aqueous media, stabilizing agents such as thiols are used to vary the particle size. Thiols terminate the growth of colloidal particles probably by attaching to the surface of the particles (Nosaka, Y.; Yamaguchi, K.; Miyama, H.; Hayashi, H., Chem. Lett. 1988, p605, Swayambunathan, V.; Hayes, D.; Schmidt, K. H.; Liao, Y. X.; Meisel, D., J. Am. Chem. Soc. 1990, v112, p 3831, and Nosaka, Y.; Ohta, N.; Fukuyama, T.; Fuji, N. J., Colloid Interface Sci. 1993, v155, p 23.

The art demonstrates a need for the present invention. Dispersion of semiconductor nanocrystals in polymers has found particular interest in optical studies due to their quantum confinement effects and size-dependent photo emission characteristics. Generally, nanocomposites of polymer and semiconductor nanocrystals have been accomplished via an aqueous dispersion process. The polymer itself acts as a steric stabilizer and renders the particles immobile. In most cases, additional surfactants are added to the process to enhance the stability of the dispersions. Although, the previous process produces nanocrystals below 10 nm size, it appears to be limited to water soluble polymers. Due to the growing demand for nanocomposite materials for optical applications using high performance polymers as the matrix, an in-situ method was needed for non-aqueous preparation of nanocomposites (e.g. lead sulfide nanocomposites).

BRIEF DESCRIPTION OF THE INVENTION

A first broad embodiment of the invention provides for a method for making a polymer nanocomposite by the steps of
a. mixing and reacting an aqueous solution of a metal containing salt with a non-aqueous solution of a thiol or carbamate to form a metal containing thiol or metal containing carbamate in the non-aqueous solution;
b. collecting the metal containing thiol or carbamate non-aqueous solution;
c. mixing the collected non-aqueous solution with a polymer solution; and
d. (1) reacting the mixture from step c with a cleaving agent and drying to form the polymer nanocomposite; or (2) drying the mixture from step c and reacting with a cleaving agent to form the polymer nanocomposite. Typically, in some embodiments the of the invention in step d(1) the mixture is also reacted with a crosslinker. In other embodiments when a compatibilizer is added in step c, the metal thiol or carbamate is typically more compatible with the polymer. In yet other embodiments step a occurs in the presence of a phase transfer catalyst.

A yet further embodiment of the invention includes a polymer nanocomposite produced by the steps of the first broad embodiment outlined above.

A further broad embodiment of the invention includes a method for making a polymer nanocomposite by the steps of
a. mixing and reacting an aqueous solution of a metal salt with a non-aqueous solution of a thiol or carbamate to form a metal containing thiol or metal containing carbamate in the non-aqueous solution;
b. collecting the metal containing thiol or metal containing carbamate non-aqueous solution;
c. drying the solution and surface treating, wherein the metal containing thiol or metal containing carbamate is more compatible with a polymer and/or prevents agglomeration;
d. (1) mixing the surface treated material from step c with a heated polymer and reacting with a cleaving agent to form the polymer nanocomposite; or (2)(a) dissolving or dispersing the surface treated material from step c in a solvent and mixing with a polymer solution; and (b) reacting the product of step d(2)(a) d with a cleaving agent and drying to form the polymer nanocomposite. Typically, in some embodiments in step d(1) and d(2) the mixture is also reacted with a crosslinker. In yet other embodiments step a occurs in the presence of a phase transfer catalyst.

An additional embodiment of the invention includes a polymer nanocomposite produced by the steps outlined in the second of the further broad embodiment.

In some embodiments the metal salt used with the invention is selected from the group consisting of metal acetate or metal carbamate (may be a metal thiol carbamate), metal chlorides and metal alkoxides or metal alkyl aryl oxides. The metal in the metal salt is typically selected from the group consisting of lead, cadmium, germanium, tin, iron, cobalt, nickel, copper, mercury, zinc, and combinations thereof. In other embodiments, when a crosslinker is used the crosslinking is by a crosslinking chemical, by heat, by UV light, by gamma radiation, or by electron beam. In embodiments where a phase transfer catalyst is used it is typically selected from the group consisting of tetrabutylammonium halide, tetrabutylammonium hydrogen sulfate, tetrabutylammonium tetrafluoroborate, benzyltriethylammonium halide, hexadecyltrimethylammonium hydrogen sulfate, tributylhexadecylphosphonium bromide, and Dibenzo-18-crown-6, 4,7,13,16,21,24-Hexaoxa-1,10-diazabicyclo{8.8.8}hexacosane.

Typically the thiol or carbamate used with the invention is selected from the group consisting of an alkyl thiol, an alkyl carbamate, an aryl thiol or poly(oxy ether) thiol, and an aryl carbamate.

In other embodiments nanocrystals are typically formed in the nanocomposite polymer.

In yet further embodiments the cleaving agent is selected from the group consisting of hydrogen sulfide, hydrogen peroxide, metal sulfide and metal containing peroxides In yet other embodiments the polymer nanocomposite is a film or a bulk polymer.

An additional embodiment of the invention includes a method for making a polymer nanocomposite by the steps of mixing a polymer dissolved in a non-aqueous solvent with a metal salt; and adding a cleaving agent to the mixture and reacting to form the polymer nanocomposite containing dispersed nanoparticles of the metal or its oxide.

DETAILED DESCRIPTION OF THE INVENTION AND BEST MODE

Figure 1:
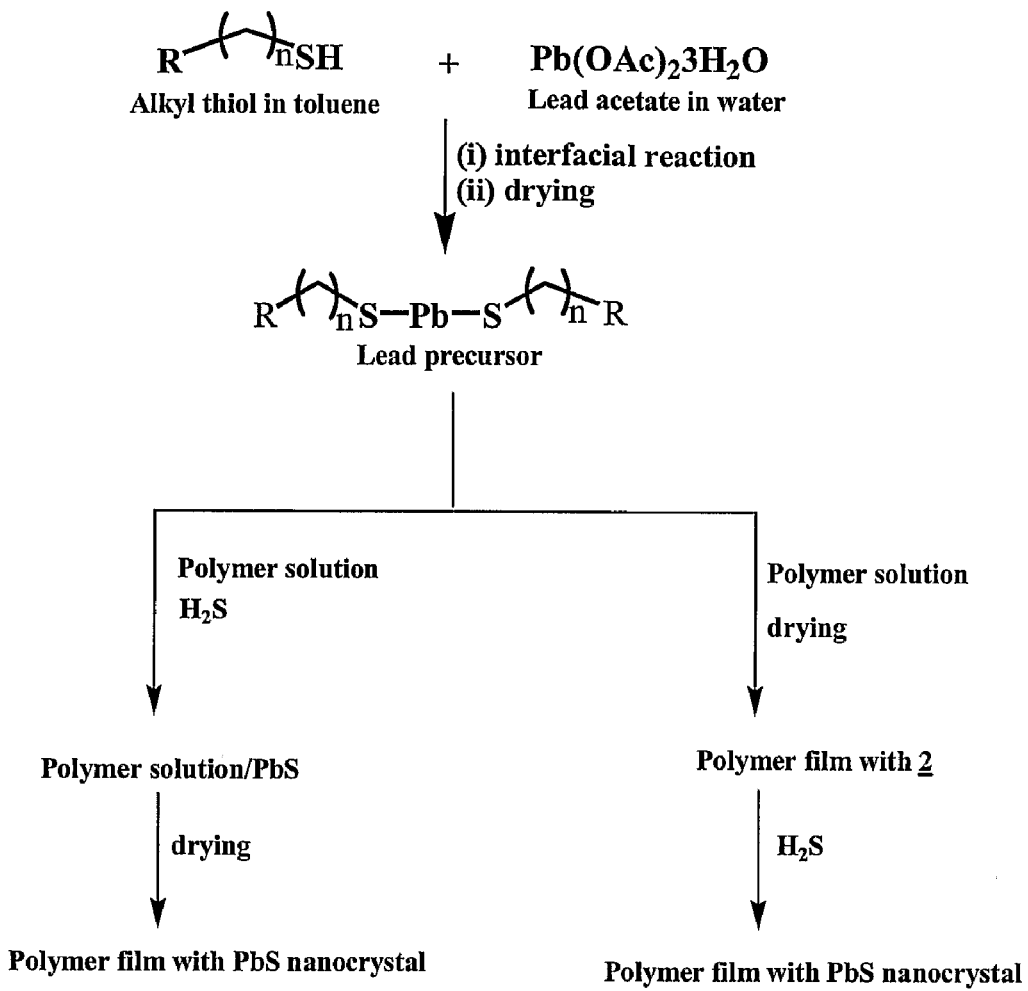
FIG. 1 is a flow chart representative of one aspect of the invention for the formation of lead sulfide nanoparticles in non-aqueous media.

Broadly, the present invention provides for higher refractive index materials without resort to higher loadings. The aggregation of nanoparticles at higher concentrations has been a problem that has limited the loading of nanoparticles. The in situ generation of nanoparticles in the present invention has two advantageous: (a) A very small particle size can be obtained and therefore optimal performance can be achieved at lower nanoparticle loading, and (b) The incipient aggregation of the nanoparticles can be controlled by steric stabilization mechanisms such as varying the chain length of the alkyl portion of the metal containing precursor (an example of which is shown in FIG. 1).

Broadly, the invention provides for the in situ preparation of polymer nanocomposites. A polymer nanocomposite is a polymer containing nanosize particles (e.g. PbS, Ge) typically less than 100 nm in diameter. In one embodiment of the invention nanoparticles are prepared in situ in a polymer by the steps of providing an aqueous solution of a metal salt (e.g. lead acetate) that is reacted with a non-aqueous solution of an alkyl thiol. The resulting intermediate product (lead alkylthiolate) partitions into the non-aqueous phase and can be collected. This intermediate is then dissolved in non-aqueous solutions containing polymers. Reaction with a cleaving agent (e.g. hydrogen sulfide gas) to form nanoparticles (e.g. lead sulfide nanoparticles) can occur either in solution (left branch of FIG. 1) or after solid film has been prepared by casting or spin coating, for example (right branch of FIG. 1).

In some aspects of the invention, the alkyl portion (e.g. alkyl thiols) may be of any length, with the chain length n chosen to achieve stabilization, i.e. prevention of aggregation, and particle size. In addition, the R group may be chosen to enhance stabilization and particle size, or provide a reactive site(s) for additional chemistry in solution or the solid state. The organic solvent may be toluene or other aromatic solvent, tetrahydrofuran, chloroform, methylene chloride, N-methyl-2-pyrrolidinone or other polar aprotic solvent, dimethyl acetamide, dimethyl formamide, ethyl acetate or other ester solvent, or an alcohol. In addition, any mixture of such solvents may be chosen to optimize stabilization and particle size.

Polymers useful with the invention typically have no hydrophilic groups or have only a few hydrophilic groups such carboxyl groups, hydroxyl groups, sulfonic groups, polyoxyether groups and the like. The polymer useful with the invention are typically a polycarbonate, a polyolefin, a vinyl polymer, an acrylic ester polymer, a polyester, a polyamide, a polyurethane, an epoxy polymer (e.g. SU-8™ photoresist polymer), a polyimide, a polyaniline, an polyaryl ether ketone, a poly aryl ether sulfone, a polybenzthiazole, a polybenzoxazole, or a polybenimidazole. Less preferred are other polymers such as poly(ethylene oxide), poly(vinyl alcohol), poly(acrylic acid), and the like but can be used if hydrophobically modified. Additionally, copolymers and/or blends of the above may also be used.

Cleaving agents useful with the invention include hydrogen sulfide, hydrogen peroxide, metal sulfide (e.g. TeS, CdS, SeS and the like), metal containing peroxides (e.g. lithium peroxide). The cleaving agents convert the metal precursors to metals, metal sulfides or metal oxides. These typically are in the form of nanoparticles.

Metals useful in the metal salts according to the invention include lead, cadmium, germanium, tin, iron, cobalt, nickel, copper, mercury, zinc, and combinations thereof.

It is believed that the improved ability to form nanoparticles of semiconductors such as lead sulfide and disperse them within a polymer matrix in a non-aqueous process will result in improved mechanical, thermal, optical, electrical, and electro-optic properties in polymer matrix nanocomposites in which the polymer matrix is soluble in organic solvents.

Typical nanoparticle sizes made by the inventive process range from about 1 nm to about 1000 nm. Typical nanoparticle sizes according to some aspects of the invention range from about 1 nm to about 100 nm. In yet other embodiments of the invention typical nanoparticle sizes range from about 1 nm to 20 nm. Typical loadings for the materials of the invention range from about 2% to 80%. Typical particle size distributions range from about 1.01 to 1.5 and in some embodiments from 1.01 to 1.1.

The particle size and their distributions were determined using a Coulter N4 Plus™ light scattering particle size analyzer. The mean particle diameter was the average of 20 scans. The particle size distribution was calculated from the following equation:

$$\text{Particle Size distribution} = D_w/D_n, D_w = N_i D_i^4 / N_i D_i^3 \text{ and}$$
$$D_n = N_i D_i / N_i$$

where Ni and Di are the frequency and the mean diameter of the particles, $D_w$=weight average, and $D_n$=number average.

The following examples are illustrative and are not intended to limit the scope of the invention in any way.

EXAMPLE 1

Synthesis of Metal Alkyl Thiolate

This example describes the synthesis of lead dodecyl thiolate. In a three neck 250 mL round bottom flask fitted with an homogenizer and addition funnel, there were charged 1.0 gram of $Pb(OAc)_2.3H_2O$ and 50 mL distilled water. The homogenizer was kept on throughout the reaction period. 1.1 g of dodecane thiol was dissolved in toluene and added drop wise for a duration of 30 min using an addition funnel. The reaction was allowed to continue for additional 30 min and the contents were transferred in a separating funnel. The toluene layer was washed three times with 250 mL water and confirmed by the absence of unreacted $Pb(OAc)_2:3H_2O$ by passing $H_2S$ gas to the washed water. The toluene layer was poured into a crystallization bowl and dried at room temperature in vacuum oven for 12 hours and then at 100° C. for 8 hours. Yield: about 65%. The structure of the lead dodecyl thiolate was confirmed by IR spectroscopy.

EXAMPLE 2

Figure 2:
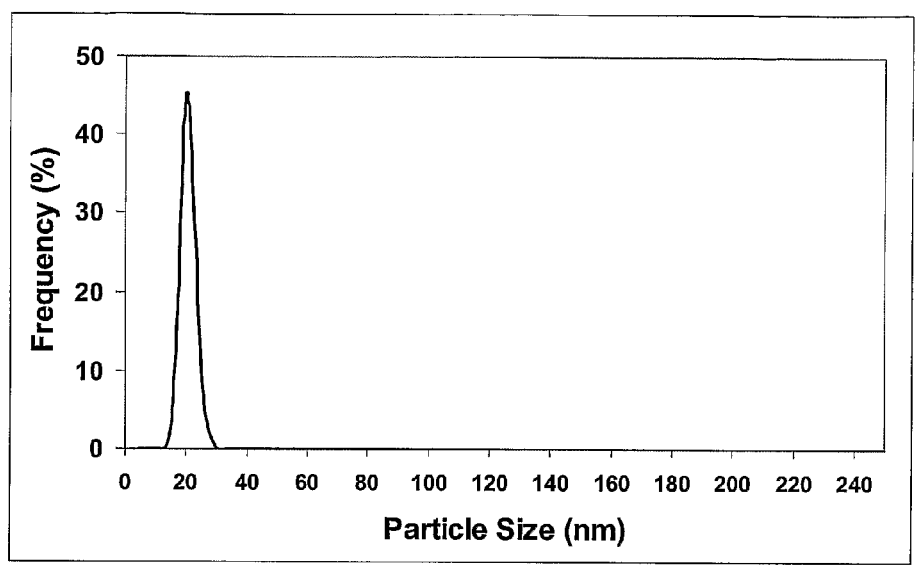
FIG. 2 shows the particle size distribution obtained from the in-situ synthesis of PbS nanoparticles in poly(methyl methacrylate-co-butylacrylate). The horizontal scale is the particle size in nm and the vertical scale is the frequency distribution of the particles in %.

This example illustrates the in-situ synthesis of PbS nanoparticles in poly(methyl methacrylate-co-butylacrylate): 20 grams of poly(methyl methacrylate-co-butylacrylate) PMMA-BA (product of Rohm & Haas) was dissolved in 100 mL of toluene to make 20% (W/V) solution. Lead dodecyl thiolate as made in Example 1 was weighed in a glass vial (0.25 gram) and added 10 grams of PMMA-BA solution and mixed well using a magnetic stir bar over a stirrer/hot plate and the temperature of the hot plate was maintained around 80° C. $H_2S$ gas was passed thro this mixture for 10 minutes to obtain PbS nanoparticles with a mean particle size of about 20 nm. The particle size distribution of the polymer solution containing the PbS nanoparticles is shown in FIG. 2. FIG. 2 shows that the particle sized distribution is narrow being mostly about 20 nm+/−about 10 nm.

Samples were obtained at 12.5 wt % loading and at 25 wt % loading.

EXAMPLE 3

This example illustrates the in-situ synthesis of PbS nanoparticles in poly(methyl methacrylate-co-butylacrylate) film: 20 g of poly(methyl methacrylate-co-butylacrylate)PMMA-BA (product of Rohm & Haas) was dissolved in 100 mL of toluene to make 20% (W/V) solution. Lead dodecyl thiolate as made in Example 1 was weighed in a glass vial (0.25 gram) and added 10 g of PMMA-BA solution and mixed well using a magnetic stir bar over a stirrer/hot plate and the temperature of the hot plate was maintained around 80° C. The solution was spin coated on a silicon wafer and dried at 60° C. for 30 minutes in a vacuum oven. The wafer was then placed in a glass jar fitted with a gas inlet and an outlet stopper. $H_2S$ gas was then passed through the glass jar and gently heated using a hot air gun. The clear coating turned deep blue initially and turned to black within 10 min. An SEM image of this sample was obtained that showed uniform distribution of PbS nanoparticles having a size of less than 50 nm.

EXAMPLE 4

This example illustrates the in-situ synthesis of PbS nanoparticles in poly(oxy-3-methyl-1,4-phenyleneoxy-1,4-phenylenecarbonyl-1,4-phenylene) (methyl PEEK): 10 g of methyl-PEEK (synthesized in our laboratory) was dissolved in 100 mL of dimethyl acetamide to make 10% (W/V) solution. Lead dodecyl thiolate as made in Example 1 was weighed in a glass vial (0.25 gram) and added 10 grams of methyl-PEEK solution and mixed well using a magnetic stir bar over a Stirrer/Hot plate and the temperature of the hot plate was maintained around 80° C. $H_2S$ gas was passed through this mixture for 10 minutes to obtain PbS nanoparticles. The solution was spin coated on a silicon wafer and dried at 60° C. for 30 minutes in a vacuum oven. The refractive index of the film was determined using a Metricon Prism Coupler and found to be 2.2. The high refractive index of the nanocomposite polymer indicates the formation of PbS nanocrystals.

EXAMPLE 5

This example illustrates the in-situ synthesis of PbS nanoparticles in epoxy photoresist (SU-8™ obtained from Microchem Corp.): The lead dodecyl thiolate obtained from Example 1 was dissolved (0.2 gram) in 5 mL of SU-8™ (epoxy based photoresist obtained from Microchem Corp.) by gently heating the mixture. $H_2S$ gas was passed to the mixture while stirring under a homogenizer. The product obtained was stable. The obtained product was easily spin coated on a silicon wafer. Alternatively, PbS nanocrystals were obtained after film formation. For this purpose the lead dodecyl thiolate was dissolved in SU-8™ and coated on a silicon wafer and cured at 120° C. for 2 min. The wafer was then placed in a glass jar fitted with a gas inlet and an outlet stopper. $H_2S$ gas was then passed through the glass jar and gently heated using a hot air gun. The clear coating was turned deep blue initially and turned to black within 10 min.

EXAMPLE 6

This example illustrates the in-situ synthesis of Ge nanoparticles in polystyrene.

Pluronic 17R2™ (non ionic surfactant from BASF) was dissolved in 100 ml of THF/decane (1:1 v/v) mixture and added 10 g of calcium hydride and stirred at room temperature for 48 hours. The mixture was filtered and carefully transferred to a Schlank tube. To this solution 5 g of polystyrene was dissolved and degassed. Germanium tetrachloride was added (3.0 mL) to this mixture and then 23 mL of lithium aluminum hydride (1 N in THF) was slowly added. The reaction was carried out for 3 hours and the temperature was maintained under 4° C. The solution obtained at the end of the reaction was characterized for particle size analysis and the mean particle size analysis obtained was less than 5 nm.

Example 6 confirms that in situ formation of metals as nanoparticles directly in the polymer is also a feasible route for improved materials according to another aspect of the invention.

COMPARATIVE EXAMPLE 1

This example illustrates the addition of PbS directly to PMMA-BA.

In a three neck 250 mL round bottom flask fitted with a homogenizer at the center joint and covered with septa on other two side joints. A syringe needle was used to pass the gas. The outlet of the gas was immersed in 1 N NaOH solution. Lead(II) acetate trihydrate (20 g) was charged into the flask and added 100 mL of water. Homogenized to dissolve the salt and passed $H_2S$ gas very slowly (3-5 bubbles/min) for 30 min. Filtered the product and washed five times with 100 mL of water. The dark colored product was collected in a crystallization bowl and dried at 120° C. for 5 hours under vacuum (8-10 mm Hg). The obtained product (0.25 g) was added to 20 mL of 20% (w/v) PMMA-BA in toluene and mixed well using a homogenizer. The dispersion was spin coated on a silicon wafer and dried at 60° C. for 30 minutes in a vacuum oven.

Comparative Example 1 confirmed the efficacy of in situ synthesis of the invention. It was evident from SEM measurements for the comparative example, that there were many clusters of PbS particles of about 20 um. Particle sizes varied from about 1 to 20 um. The particle size distribution was found to be very non-uniform. In comparison the in-situ synthesis of the present invention resulted in uniform dispersion of nanosize PbS nanoparticle in the polymer matrix.

The nanoparticles according to the invention are typically nanocrystals. This was confirmed by the high refractive index of the material obtained in Example 4. The nanocrystals and are useful in providing high refractive index optical materials. The nanocomposite dispersions were characterized for their particle size and for some aspects of the invention were found to be in the order of about 20 to about 50 nm for about 20% (w/w) loading.

While the forms of the invention herein disclosed constitute presently preferred embodiments, many others are possible. It is not intended herein to mention all of the possible equivalent forms or ramifications of the invention. It is to be understood that the terms used herein are merely descriptive, rather than limiting, and that various changes may be made without departing from the spirit of the scope of the invention.

We claim:

1. A method for making a polymer nanocomposite comprising:
   a. mixing and reacting an aqueous solution of a metal containing salt with a non-aqueous solution of a thiol to form a metal thiolate in the non-aqueous solution;
   b. collecting the metal thiolate non-aqueous solution;
   c. dissolving the collected non-aqueous solution of step b in a non-aqueous polymer solution; and
   d. (1) mixing and reacting the solution from step c with a cleaving agent and drying to form the polymer nanocomposite, wherein the cleaving agent reacts with the metal thiolate to form metal salt nanoparticles, and wherein the metal salt nanoparticles are distributed substantially evenly in the polymer nanocomposite; or
      (2) drying the solution from step c and then mixing with a cleaving agent to form the polymer nanocomposite, wherein the cleaving agent reacts with the metal thiolate to form metal salt nanoparticles, and wherein the metal salt nanoparticles are distributed substantially evenly in the polymer nanocomposite.

2. The method according to claim 1, wherein the metal salt is selected from the group consisting of metal acetate, metal chlorides and metal alkoxides or metal alkyl aryl oxides.

3. The method according to claim 1, wherein the metal in the metal salt is selected from the group consisting of lead, cadmium, germanium, tin, iron, cobalt, nickel, copper, mercury, zinc, and combinations thereof.

4. The method according to claim 1, wherein in step d(1) the mixture is also reacted with a crosslinker.

5. The method according to claim 4, wherein the crosslinking is by a crosslinking chemical, by heat, by UV light, by gamma radiation, or by electron beam.

6. The method according to claim 1, wherein step a occurs in the presence of a phase transfer catalyst.

7. The method according to claim 1, wherein the thiol is selected from the group consisting of an alkyl thiol, an aryl thiol or poly(oxy ether) thiol.

8. The method according to claim 6, wherein the phase transfer catalyst is selected from the group consisting of tetrabutylammonium halide, tetrabutylammonium hydrogen sulfate, tetrabutylammonium tetrafluoroborate, benzyltriethylammonium halide, hexadecyltrimethylammonium hydrogen sulfate, tributylhexadecylphosphonium bromide, and Dibenzo-18-crown-6, 4,7,13,16,21,24-Hexaoxa-1,10-diazabicyclo{8.8.8}hexacosane.

9. The method according to claim 1, wherein nanocrystals are formed in the nanocomposite polymer.

10. The method according to claim 1, wherein the cleaving agent is selected from the group consisting of hydrogen sulfide, hydrogen peroxide, metal sulfide and metal containing peroxides.

11. A method for making a polymer nanocomposite comprising:
    a. mixing a polymer dissolved in a non-aqueous solvent with a non-aqueous metal thiolate solution until the metal thiolate is dissolved in the non-aqueous polymer solution; and
    b. adding a cleaving agent to the solution of step a and reacting the cleaving agent with the non-aqueous metal thiolate to form metal salt nanoparticles wherein the polymer nanocomposite is formed; wherein the metal salt nanoparticles are distributed substantially evenly in the polymer nanocomposite.

* * * * *

UNITED STATES PATENT AND TRADEMARK OFFICE
CERTIFICATE OF CORRECTION

| | | |
|---|---|---|
| PATENT NO. | : 7,879,935 B2 | Page 1 of 1 |
| APPLICATION NO. | : 11/570187 | |
| DATED | : February 1, 2011 | |
| INVENTOR(S) | : Lalgudi et al. | |

It is certified that error appears in the above-identified patent and that said Letters Patent is hereby corrected as shown below:

Title page, Item (12) change to Lalgudi et al.

Item (75) The first named inventor is corrected to be: Ramanathan S. Lalgudi

Signed and Sealed this
Twenty-second Day of November, 2011

David J. Kappos
*Director of the United States Patent and Trademark Office*